O. R. SELL.
VEHICLE HEAD LAMP.
APPLICATION FILED MAY 26, 1916.
1,217,841. Patented Feb. 27, 1917.
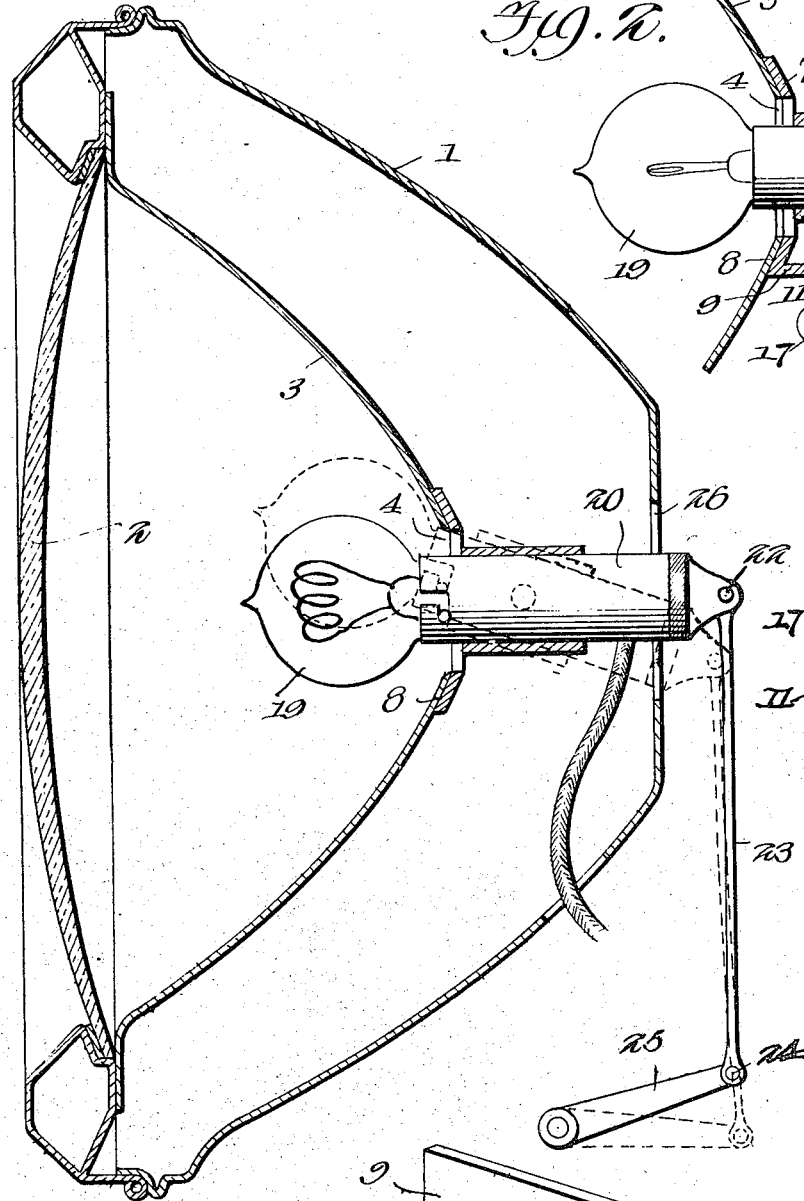
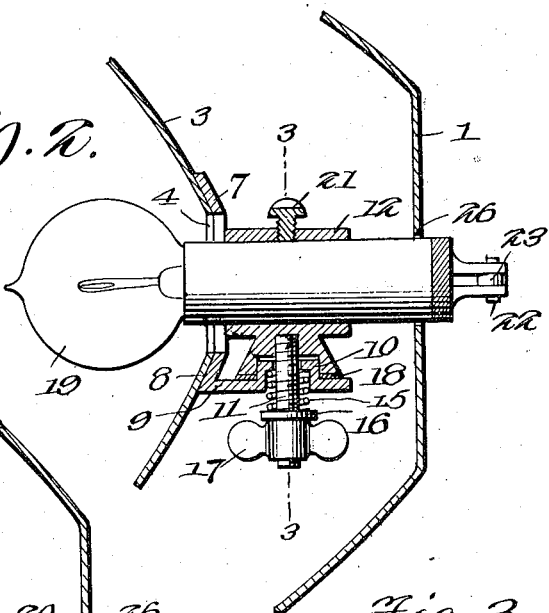
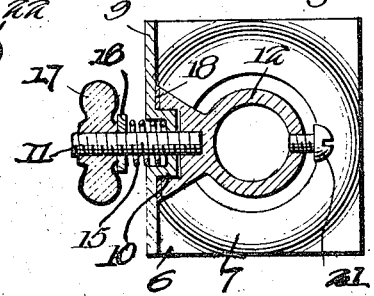
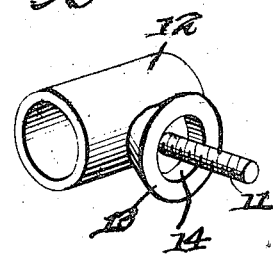
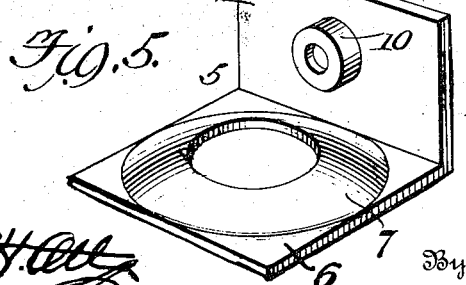
Inventor
Otto R. Sell,
By Victor J. Evans
Attorney

UNITED STATES PATENT OFFICE.

OTTO R. SELL, OF COLORADO SPRINGS, COLORADO.

VEHICLE HEAD-LAMP.

1,217,841.   Specification of Letters Patent.   Patented Feb. 27, 1917.

Application filed May 26, 1916. Serial No. 100,072.

*To all whom it may concern:*

Be it known that I, OTTO R. SELL, a citizen of the United States, residing at Colorado Springs, in the county of El Paso and State of Colorado, have invented new and useful Improvements in Vehicle Head-Lamps, of which the following is a specification.

This invention relates to vehicle head-lamps, the main object of the invention being to provide simple means whereby the rays of light from the light producing element may be changed as to their direction in order to enable the operator of the vehicle to throw the rays of light in such a direction as not to blind and confuse pedestrians and the drivers of other vehicles, the far reaching horizontal rays being capable of being temporarily eliminated without reducing the amount of light thrown downwardly on the roadway directly in front of the machine and sufficiently to both sides thereof to properly illuminate a sufficient zone to avoid accidents.

The particular object of the invention is to provide novel means for mounting the lamp or source of light so that it may be adjusted to several different positions in order to obtain the result referred to.

With the above and other objects in view, the invention consists in the novel construction, combination and arrangement of parts, as herein described, illustrated and claimed.

In the accompanying drawings:—

Figure 1 is a vertical central section through a headlamp embodying the present invention.

Fig. 2 is a horizontal section through the same.

Fig. 3 is a section on the line 3—3 of Fig. 2.

Fig. 4 is a detail perspective view of the pivoted lamp holder detached.

Fig. 5 is a similar view of the bracket on which the lamp holder is mounted.

Referring to the drawings 1 designates the body or casing of the headlamp of a vehicle such as an automobile, said lamp comprising the front panel or lens 2 and reflector 3, said parts being combined and arranged in any usual or preferred manner. In carrying out the present invention, the reflector 3 is formed centrally with an opening 4 extended therethrough and secured to the rear side of the reflector 3 is a bracket designated generally as 5 and comprising an attaching portion 6 having a dished part 7 which provides a concaved abutment face 8 that bears against the rear side of the reflector 3 as shown in the drawings and is brazed, soldered or otherwise permanently fastened thereto in the relation shown.

The bracket 5 also has a plate-like portion 9 extending substantially at a right angle to the portion 6 and formed with an inwardly projecting tubular boss 10 through which passes the threaded stem 11 of a pivoted lamp holder 12 to which the threaded stem or shank 11 is permanently attached. Surrounding the stem or shank 11 is a hollow boss 13 the bore 14 of which is of proper size to receive the boss 10 of the bracket so as to form a pivotal connection between the holder 12 and the bracket 5.

Encircling the stem or shank 11 is a coiled friction regulating spring 15 the inner end of which is received in the bore 14 of the boss 13 and the outer end of which is engaged by a washer 16. A jam nut 17 is threaded on the stem or shank 12 and bears against the washer 16 so as to compress the spring 15 more or less. A friction washer 18 is interposed between the boss 13 and the portion 9 of the bracket 5, said washer acting with more or less friction and resistance to the turning movement of the holder 12 as the spring 15 is placed under greater or less tension by means of the nut 17 which is of the winged variety.

The lamp 19 is detachably connected by a pin and bayonet slot joint as shown to a tubular lamp post socket 20 the external diameter of which adapts it to be slidingly received in the tubular body of the lamp holder 12 where it may be fixed at any desired point of adjustment by means of a set screw 21 threaded through the wall of the lamp holder 12. By reference to Fig. 1 it will be noted that the lamp holder 12 is adapted to be oscillated about a horizontal axis, the stem or shank 11 forming the pivot around which said holder turns. At its rear end outside of the casing 1, the socket 20 has connected thereto by a pivot 22, an operating connection 23 which is in turn attached by a pivot 24 to an operating member 25 shown in the form of a lever. The rear part of the casing 1 is formed with an orifice or slot 26 to admit of the necessary oscillatory movements of the lamp socket 20.

From the foregoing description, taken in connection with the accompanying drawings, it will now be understood that the lamp socket 20 is adjustable longitudinally through the holder 12 and that the holder 12 is adapted to oscillate when a corresponding movement is imparted to the lamp socket. The lamp 19 is adapted to be moved from the full line position of Fig. 1 to the dotted line position of the same figure or to any point between the two limits of movement, thus enabling the driver to deflect the rays of light and cause them to be thrown either in a straight ahead direction or in a downward direction so as to prevent the transmission of blinding rays of light to pedestrians and the drivers of other vehicles.

I claim:—

1. The combination with a headlamp casing, and a reflector therein formed with a central opening, of a bracket having a concaved bearing face secured in abutting relation to the rear convex face of the reflector and surrounding the central opening therein, a lamp holder pivotally mounted on said bracket, a lamp socket insertible in and adjustable in relation to said holder, and tensioning means for said holder.

2. The combination with a headlamp casing, and a reflector therein formed with a central opening, of a bracket having a concaved bearing face secured in abutting relation to the rear convex face of the reflector and surrounding the central opening therein, a lamp holder pivotally mounted on said bracket, a lamp socket insertible in and adjustable in relation to said holder, tensioning means for said holder, said tensioning means comprising a friction member interposed between the lamp holder and bracket, a spring adapted to hold the lamp holder with greater or less pressure against said friction member, and means for adjusting the tension of said spring.

3. The combination with a head lamp casing, and a reflector therein formed with a central opening, of a bracket located in the rear of said reflector, a lamp holder pivotally mounted on said bracket, tensioning means for said holder comprising a friction member interposed between the lamp holder and bracket, and means for increasing and decreasing the frictional resistance between said lamp holder and bracket.

In testimony whereof I affix my signature.

OTTO R. SELL.